United States Patent [19]

Gachot et al.

[11] 4,072,172

[45] Feb. 7, 1978

[54] PNEUMATIC TIMING DEVICE

[76] Inventors: Jean Gachot, 26 bis, Avenue de Paris, Soisy-Sous-Montmorency, Val d'Oise; Siméon Lekarski, 138, Boulevard de la Republique, Saint-Cloud, Hauts-de-Seine, both of France

[21] Appl. No.: 658,864

[22] Filed: Feb. 17, 1976

[30] Foreign Application Priority Data

Feb. 27, 1975 France ................................ 75 06151

[51] Int. Cl.[2] ........................................ G05B 11/44

[52] U.S. Cl. .......................... 137/624.2; 235/201 ME; 251/29

[58] Field of Search ....................... 137/624.11, 624.13, 137/624.18, 624.2, 624.14, 624.15; 235/201 ME; 251/29, 28

[56] References Cited

U.S. PATENT DOCUMENTS 3,590,582 7/1971 German ........................... 137/624.14

*Primary Examiner*—Alan Cohan

*Attorney, Agent, or Firm*—Young & Thompson

[57] ABSTRACT

An instantaneous signal applied to the inlet of the timing device is passed through a restrictor into a capacitance and the resultant rising pressure is compared with an adjustable-level reference pressure signal which defines the timing period. When the capacitance pressure exceeds the reference signal value, a comparison signal initiates the release of an obturator. The reference pressure propagates to the outlet of the device and produces the time-delay signal.

6 Claims, 4 Drawing Figures

PNEUMATIC TIMING DEVICE

This invention relates to a pneumatic timing device of the type comprising an inlet for receiving an instantaneous signal, an outlet for delivering a time-delay signal, a restrictor mounted in series with the inlet and a capacitance designed to receive the instantaneous signal through said restrictor.

In general it is found desirable to provide timing devices of this type with elements for regulating the timing period. In the devices of known types, this timing period corresponds to the time taken by the air to attain a sufficient pressure within the capacitance to trigger the receiver which is located downstream of the device. And said timing period is controlled in known devices by adjusting the opening of the restrictor. If this latter is constituted by a needle valve of the cone-point pintle type, action is accordingly produced on the needle valve. It is also possible to regulate the timing period by modifying the volume of the capacitance.

As a rule, the known devices mentioned above are attended by a disadvantage in that they permit only timing periods of fairly short duration. In fact, the receiver triggering threshold is often fairly low compared with the supply pressure and an increase in the timing period makes it necessary to provide a very small restrictor opening. In point of fact, this expedient is very soon found to be limited by the danger of obstruction by impurities in the air and by machining which is below the requisite quality standard.

A further disadvantage of known devices lies in the general technology of receivers for the signal emitted by the capacitance. When the control pressure becomes close in value to the triggering pressure, said receivers give rise in most cases to mechanical friction and diaphragm pulsation which are attended by uncertainties in the timing period.

Another drawback of known devices arises from the potential hazard of parasitic signals which are liable to be produced within the output network by reason of various imperfections and to affect the operation of the timing device as said signals pass back towards this latter.

Finally, when the capacitance is under pressure after a timing cycle, it proves necessary to drain said capacitance as rapidly as possible for a further cycle. In known devices, this draining operation is usually performed by means of the line which supplies the instantaneous control signal, thereby resulting in pressure drops and in a regretable speed limitation of said stage.

The aim of the present invention is to produce a pneumatic timing device which secures freedom from the disadvantages mentioned in the foregoing by offering a broad time-control range extending especially to high time-delay values, by initiating positive trigger action, by eliminating any parasitic signals produced by the downstream network and by permitting rapid draining of the capacitance.

In accordance with the invention, the pneumatic timing device comprises an inlet for receiving an instantaneous signal, an outlet for delivering a time-delay signal, a restrictor mounted in series with the inlet and a capacitance for receiving the instantaneous signal aforesaid through said restrictor in order to ensure that the pressure within said capacitance attains a predetermined threshold value at the end of a predetermined time interval in order to initiate the appearance of the time-delay signal at the outlet. The device essentially comprises a reference inlet adapted to receive an adjustable-level signal and connected to the outlet through first blocking means, and means for comparing the pressure existing within the capacitance with the adjustable-level signal and for changing state so as to deliver a comparison signal when said pressure becomes higher than said adjustable-level signal, said comparison signal being applied to the first blocking means for releasing said means.

As a result of these arrangements, the timing period is set by adjusting the level of the reference signal. Devices for adjusting this level over a very wide band are in fact already known. And the opening of the restrictor can remain of fixed value or else it may be adjusted if necessary over a sufficiently narrow band to ensure that its operation remains reliable.

In accordance with a preferred embodiment of the invention, the comparison signal aforesaid has a low level and is obtained by connecting to the atmosphere at a sufficiently high rate of flow to ensure that said signal is obtained in a practically instantaneous manner at the instant of reversal of the comparison means and at a sufficiently low rate of flow to ensure that said signal remains prior to said reversal at a sufficiently high level to maintain the first blocking means in the locked condition.

There is thus obtained positive release of the blocking means and this gives rise to the positive appearance of the time-delay signal at the outlet.

In a preferred embodiment of the invention, second blocking means isolate the outlet connection and are released in order to permit the appearance of the time-delay signal.

In consequence, no parasitic signal which appears in the downstream network is liable to pass back to the timing device during the timing period.

In a particular embodiment of the invention, the device comprises an atmospheric connection for draining the capacitance when the instantaneous signal is no longer applied.

At the end of the timing period, the device is therefore ready to operate again without any need to wait a further period of more or less appreciable duration for drainage of the capacitance via the transmission line.

Further properties of the invention will become apparent from the following detailed description, reference being made to the accompanying drawings which are given by way of example and not in any limiting sense, and in which.

Figure 1:
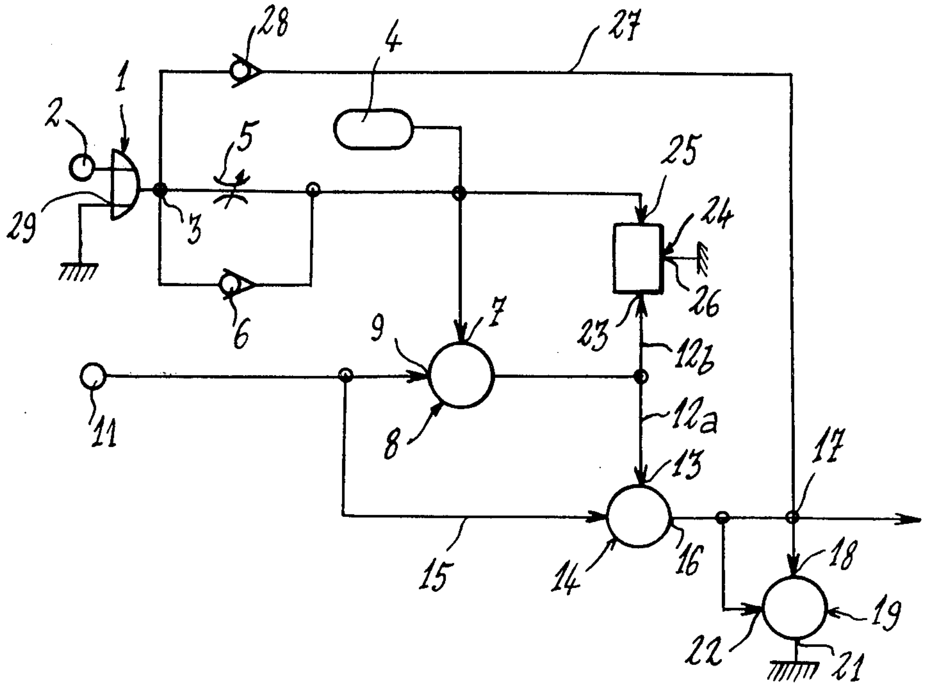
FIG. 1 is a diagram of the device in accordance with the invention.

Referring first to FIG. 1, the timing device comprises an input stage 1 provided with an inlet 2 for receiving an instantaneous signal. Said input stage which will be described in greater detail hereinafter can advantageously be in accordance with the stage described in French patent application No. 69 41 589 (with reference to FIG. 4 of said application). The outlet 3 of the stage 1 is connected to a capacitance 4 by means of a variable restrictor 5 of known type consisting of a needle-valve, for example. A nonreturn valve 6 is mounted in parallel with the restrictor 5.

The capacitance 4 is also connected to an inlet 7 of a comparator 8 which will be described in detail hereinafter and can advantageously be in accordance with the design described in French patent application No. 73 23 352. The other inlet 9 of said comparator is connected to a reference inlet 11 which is intended to receive an adjustable pressure of compressed air produced for example by an accurate and adjustable expansion unit.

The outlet of the comparator 8 is connected by means of a line 12*a* to the control inlet 13 of a pneumatic obturator 14 which can be of known type or similar to the comparator 8. The supply inlet of the obturator 14 is connected to the reference inlet 11 by means of a line 15.

The outlet 16 of the obturator 14 is connected to an outlet connection 17 of the timing device. The outlet 17 is connected to an inlet 18 of an obturator 19 which is similar to the obturator 14, the outlet 21 of said obturator 19 being in communication with the atmosphere and the control inlet 22 of this latter being connected to the outlet 16 of the obturator 14.

The outlet of the comparator 8 is also connected by means of a line 12*b* to an inlet 23 of a controlled leakage stage 24, another inlet 25 of which is connected to the capacitance 4 and an outlet 26 of which communicates with the surrounding atmosphere. The stage 24 will be described in detail hereinafter.

The outlet 17 of the timing device is connected to the outlet 3 of the inlet stage 1 by means of a line 27 comprising a nonreturn valve 28 which is mounted so as to prevent the circulation of air from the outlet 3 to the outlet 17.

Finally, the inlet stage 1 is provided with a port 29 which communicates with the atmosphere.

Figure 2:
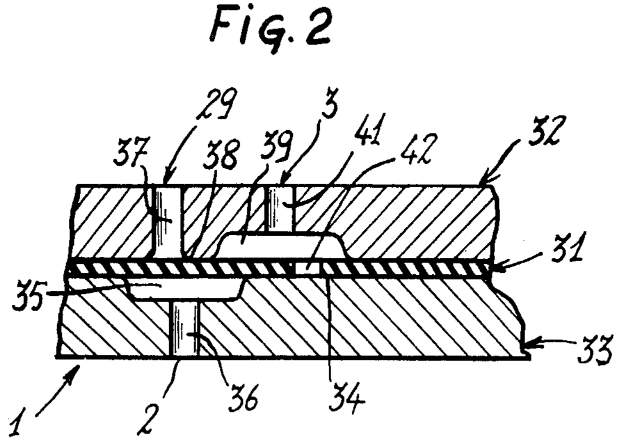
FIGS. 2, 3 and 4 are sectional views of certain elements of the device.

The inlet stage 1 will now be described in detail. Reference being made to FIG. 2 which shows a cross-section of the stage 1, a flexible diaphragm 31 is maintained clamped between two rigid plate elements 32, 33 by known means (not shown in the drawings).

In the surface 34 of the plate element 33 which cooperates with the diaphragm 31 is formed a chamber 35 which is connected to the inlet 2 of the stage 1 by means of a duct 36. A duct 37 formed in the plate element 32 opens in front of the diaphragm 31 opposite to the chamber 35 and is also joined to the atmospheric connection 29 of the stage 1.

In the surface 38 of the plate element 32 is formed a chamber 39 which is similar to the chamber 35 and located partially opposite to this latter. A duct 41 drilled in the plate element 32 connects the chamber 39 to the outlet 3 of the stage 1.

Finally, a port 42 is formed in the membrane 31 at the level of that portion of the chamber 39 which is not located opposite to the chamber 35.

When a compressed-air pressure is applied to the inlet 2, said pressure deforms the diaphragm 31 which undergoes deflection opposite to the chamber 39 and moves away from the surface 34 of the plate element 33 in order to allow air to pass through the port 42 towards the duct 41 and the outlet 3, any communication with the duct 37 being cut-off by the diaphragm 31 which is applied against the surface 38 of the plate element 32 by reason of the pressure exerted on the inlet 2.

When the pressure is no longer applied to the inlet 2, the pressure which prevails at the outlet 3 causes deformation of the diaphragm 31 towards the interior of the chamber 35 and causes said diaphragm to move away from the surface 38 of the plate element 32. In consequence, the compressed air which is applied to the outlet 3 escapes to the atmosphere through the duct 37, the port 42 being applied against the surface 34 in leak-tight manner in order to prevent a return of air to the inlet 2.

Figure 3:
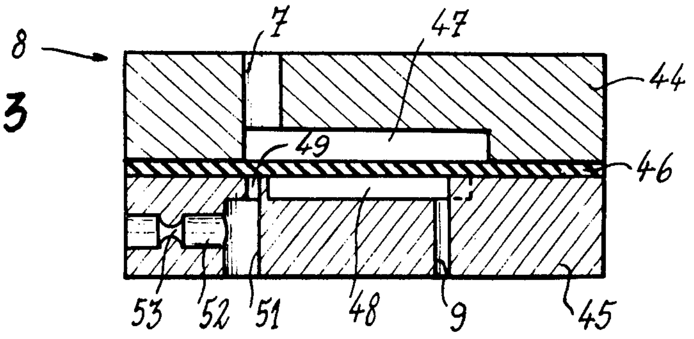

The comparator 8 will now be described with reference to FIG. 3. Said comparator comprises two elements 44, 45 between which is clamped a flexible diaphragm 46. A chamber 47 is formed in the element 44 and communicates with the inlet 7 which is connected to the capacitance 4. A chamber 48 is formed in the element 45 and communicates with the inlet 9 which is connected to the reference inlet 11.

Moreover, a small-diameter port 49 formed in the element 45 has its opening in front of the diaphragm 46 outside the perimeter of the chamber 48 but very close to said perimeter. The perimeter of the chamber 47 is larger than that of the chamber 48 in order to include both the chamber 48 and the port 49.

The port 49 communicates with a duct 51 which is connected to the obturator 14 by means of the line 12*a*. Said port also communicates by means of a duct 52 followed by a constriction 53 with the line 12*b* which is connected to the controlled leakage stage 24.

Complementary details in regard to the structure of the comparator 8 are given in French patent application No. 73 23 352.

As long as the pressure within the capacitance 4 is lower than the reference pressure, the diaphragm 46 is lifted and opens the port 49, thereby establishing the reference pressure in the obturator 14 via the duct 51 and the line 12*a* as well as in the controlled leakage stage 24 via the duct 52, the constriction 53 and the line 12*b*.

Figure 4:
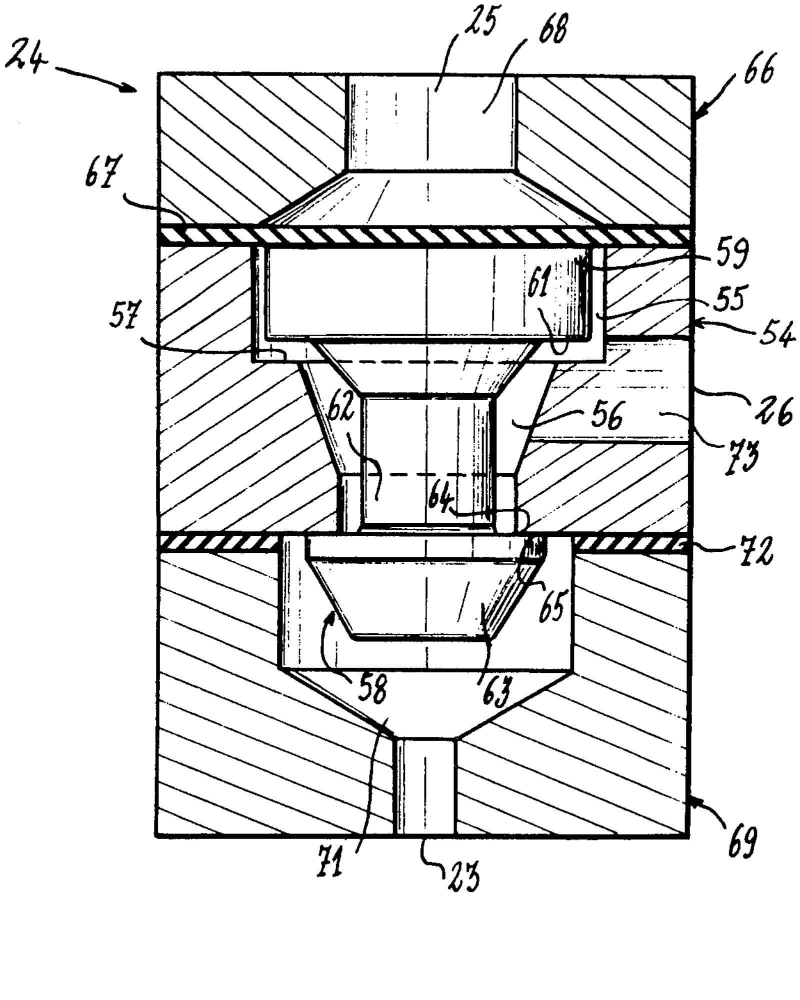

When the pressure within the capacitance 4 becomes higher than the reference pressure, the diaphragm 46 closes-off the port 49 and the line 12*a* is accordingly connected to the atmosphere by the controlled leakage stage which will now be described with reference to FIG. 4.

The leakage stage 24 comprises an element 54, there being bored in said element a cylindrical cavity 55 which communicates with a coaxial cylindro-conical cavity 56 of smaller diameter so that the annular portion 57 of the bottom wall of the cavity 55 forms a flat bearing face 57.

A differential valve 58 of resilient material essentially comprises a cylindrical gate 59 having a bearing face 61 which cooperates with the bearing face 57, a rod 62 and a cylindro-conical gate 63 provided with a bearing face 64 which is intended to cooperate with the bottom face 65 of the element 54. The gate 59 is housed within the cavity 55 whilst the gate 63 projects from the element 54.

An end-cap 66 is fixed on the top face of the element 54 with interposition of a continuous diaphragm 67. On the axis of the cavities 55 and 56, the end-cap 66 is bored right through so as to form a cylindro-conical cavity 68, the largest diameter of which is substantially equal to the diameter of the cavity 55. The cavity 68 is connected to the capacitance 4 through the inlet 25. The valve 58 is mounted in such a manner as to make use of its resilient properties.

An end-cap 69 is fixed on the bottom face 65 of the element 54 and a cylindro-conical cavity 71 which is coaxial with the cavities 55 and 56 is bored right through said end-cap, the largest diameter of said cavity 71 being larger than the diameter of the gate 63 in order to accommodate this latter. The cavity 71 is connected by the inlet 23 and the line 12*b* to the outlet of the comparator 8. A seal 72 is interposed between the element 54 and the end-cap 69.

Finally, the cavity 56 is put into communication with the atmosphere by means of a duct 73 which is bored in the element 54 and has its opening in the outlet 26.

It is apparent that, when the pressure within the capacitance 4 is at zero value, the pressure produced at the outlet of the comparator 8 is applied to the gate 63 and maintains this latter in the closed condition, thus preventing any leakage to the atmosphere. However, as soon as a pressure appears within the capacitance 4 and is then exerted on the diaphragm 67, the valve 58 is displaced downwards and the gate 63 is dislodged from the bearing face 65 so as to produce a leakage. The pressure within the capacitance which is capable of initiating this action can be of low value compared with the outlet pressure of the comparator 8 and is a function of the respective diameters of the gate 63 and of the useful portion of the diaphragm 67. In the example described, the value of this pressure is of the order of one-third of the outlet pressure of the comparator 8.

The general operation of the timing device will now be described with reference to FIG. 1.

A predetermined reference pressure being applied to the reference inlet 11, for example by means of an accurately responsive expansion unit of known type, and no signal being applied to the inlet 2, the comparator 8 allows said pressure to be established within the lines **12*a* and 12*b*. Since a pressure is applied to the control inlet 13 of the obturator 14, the reference pressure which arrives via the line 15 cannot be propagated beyond the obturator 14, with the result that no signal appears at the outlet 17** of the device.

At the same time, since the inlet 23 of the controlled leakage stage 24 is alone subjected to a pressure, no leakage takes place through the outlet 26 of said device.

When an instantaneous signal appears at the inlet 2 of the input stage 1, said signal is immediately transmitted to the outlet 3 of said stage; since it is blocked by the nonreturn valves 6 and 28, said signal is capable of propagating only through the restrictor 5 in order to produce a progressive increase in pressure within the capacitance 4.

As soon as the pressure within the capacitance 4 attains a predetermined fraction of the reference pressure, the valve 58 of the leakage stage 24 is actuated so as to initiate leakage to the atmosphere from the lines **12*a*, 12*b* via the outlet 26. However, the internal dimensions of the leakage stage 24 are such that the pressure drop which takes place therein is sufficient to maintain within the lines 12*a*, 12*b* a pressure whose value is in turn sufficient to maintain the obturator 14** in the blocked condition.

When the pressure within the capacitance 4 becomes equal to the reference pressure, the comparator 8 changes state and delivers a zero pressure to the lines **12*a*, 12*b* which are practically instantaneously discharged to the atmosphere via the outlet 26 of the leakage stage 24. The obturator 14 is then released and the reference pressure is propagated to the outlet 17** in order to produce the time-delay signal.

As long as the time delay has not completely elapsed, no pressure is applied to the control inlet 22 of the obturator 19, with the result that the line located downstream of the outlet 17 is connected to the atmosphere by said obturator. All the parasitic signals which are liable to originate from said line are thus eliminated and cannot disturb the operation of the timer.

When the input signal is no longer applied to the inlet 2 of the stage 1, the outlet 3 of the stage is immediately connected to the atmosphere as explained earlier. The valve 28 then opens and causes the time-delay signal to disappear at the outlet 17. At the same time, the valve 6 opens and permits draining of the capacitance 4.

Since the port 29 for discharge to the atmosphere is incorporated with the timing device, there is no loss of line pressure, the device is instantaneously drained and immediately ready for another operating cycle.

It will also be noted that this device does not give rise to any continuous leakage and that, by virtue of the controlled leakage stage 24, the essential leakage takes place only during the time delay and even during a fraction of said delay. This fraction is predetermined as explained earlier by the respective dimensions of the gate 63 and of the useful portion of the diaphragm 67.

The duration of the time delay is essentially adjusted by varying the reference pressure applied to the inlet 11. Particularly in the case of long time delays, the disadvantages attached to a constriction which provides a very small opening are no longer encountered. Time delays of substantial duration are obtained in this case by applying a high reference pressure. The fact that the restrictor 5 is adjustable serves only to increase the scope of adjustment of the time-duration without entailing any need to give a very small opening to said restrictor.

The invention is not limited to the embodiment described in the foregoing. In fact, this embodiment is presented in the form of separate elements but it would be an advantage to construct the device in the form of an integrated module by having recourse to known drilled-duct techniques.

Other alternative circuit designs could also be conceived without thereby departing either from the scope or the spirit of the invention.

We claim:

1. In a pneumatic timing device comprising an inlet for receiving an instantaneous signal, an outlet for delivering a time-delay signal, a restrictor mounted in series with the inlet and a capacitance for receiving the instantaneous signal aforesaid through said restrictor in order to ensure that the pressure within said capacitance attains a predetermined threshold value at the end of a predetermined time interval in order to initiate the appearance of the time-delay signal at the outlet; the improvement comprising a reference inlet in parallel with the first-mentioned inlet and restrictor and capacitance and adapted to receive an adjustable-level signal and connected to the outlet through first blocking means, means for comparing the pressure existing within the capacitance with the adjustable-level signal of said reference inlet and for changing stage so as to deliver a comparison signal when said pressure becomes higher than said adjustable-level signal, means for applying said comparison signal to the first blocking means for releasing said first blocking means thereby to permit said adjustable-level signal to proceed to said outlet to produce said time-delay signal, the comparator being so arranged as to ensure that its output signal passes from a high level to a low level at the moment of reversal, and a controlled leakage stage for cooperating in the production of said low-level signal, said stage being so arranged as to ensure that the leakage flow rate is sufficiently high to permit a practically instantaneous appearance of the low-level signal and sufficiently low to ensure that said signal remains prior to reversal at a sufficiently high level to maintain the first blocking means in the locked condition, the controlled leakage stage comprising a differential valve which is subjected on the one hand to the pressure prevailing within the capacitance and on the other hand to the reference pressure and which is adapted to move when the first pressure aforesaid exceeds a predetermined fraction of the second pressure whereupon a leakage is opened in the outlet circuit of the comparator prior to said moment of reversal.

2. A device according to claim 1, wherein the outlet is put into communication with the atmosphere by means of second blocking means which are intended to be locked by the time-delay output signal.

3. A device according to claim 1, wherein said device comprises an atmospheric connection and means for discharging the capacitance through said connection when the instantaneous signal is no longer applied.

4. A device according to claim 1, wherein the restrictor has an adjustable opening.

5. A device according to claim 1, wherein the complete assembly of elements aforementioned constitutes an integrated module.

6. A pneumatic timing device, wherein said device comprises:

an input stage comprising an inlet for an instantaneous signal and an outlet for connecting the device to the atmosphere, said outlet being open only in the absence of a signal at the inlet, a restrictor and a capacitance in series with the input stage, the restrictor being by-passed by a nonreturn valve, a reference inlet for receiving a predetermined and adjustable reference pressure, said reference inlet being in parallel with the first-mentioned inlet and restrictor and capacitance, a comparator which normally delivers a high-level signal for comparing the pressure within the capacitance with the reference pressure and for changing stage and delivering a low-level signal when the first pressure attains and exceeds the value of the second pressure, a first obturator having a signal inlet to which the reference pressure is applied and a control inlet to which the comparator output signal is applied so as to maintain the obturator in the blocked condition when said signal is at the high level and to unblock the obturator when said signal is at the low level, the outlet of said obturator being connected to the outlet of the timing device, whereby when said obturator is unblocked said adjustable reference pressure proceeds to said outlet of the timing device to produce a time-delay output signal, a controlled leakage stage comprising a differential valve to which is applied on the one hand the pressure within the capacitance and on the other hand the comparator output signal, said leakage stage being caused by said output signal to open a leak to the atmosphere prior to the unblocking of the obturator and as soon as the pressure within the capacitance exceeds a predetermined fraction of the reference pressure and being so arranged as to ensure that said leak is sufficiently small to maintain the first obturator in the locked condition as long as the comparator has not changed state, and a second obturator which is adapted to connect the outlet of the device to the atmosphere during the entire timing period and the control inlet of which is responsive to the time-delay output signal so as to lock said obturator at the instant of appearance of said signal.

* * * * *